United States Patent
Ramanzin

(10) Patent No.: US 6,847,683 B2
(45) Date of Patent: Jan. 25, 2005

(54) VIDEO CODING METHOD AND CORRESPONDING ENCODER

(75) Inventor: Yves Ramanzin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 117 days.

(21) Appl. No.: 09/989,252

(22) Filed: Nov. 20, 2001

(65) Prior Publication Data
US 2002/0071489 A1 Jun. 13, 2002

(30) Foreign Application Priority Data
Nov. 23, 2000 (FR) .......................................... 00403281

(51) Int. Cl.⁷ .......................... H04N 7/12; H04N 11/04; H04N 11/02
(52) U.S. Cl. ............................ 375/240.13; 375/240.14; 375/240.15; 375/240.12
(58) Field of Search ...................... 375/240.12, 240.15, 375/240.14, 240.13, 240.16; 382/243

(56) References Cited

U.S. PATENT DOCUMENTS

| | | | |
|---|---|---|---|
| 5,742,343 A | | 4/1998 | Haskell et al. .............. 348/437 |
| 6,055,012 A | * | 4/2000 | Haskell et al. ................ 348/48 |
| 6,057,884 A | * | 5/2000 | Chen et al. ............ 375/240.16 |
| 6,233,356 B1 | * | 5/2001 | Haskell et al. .............. 382/243 |
| 6,377,309 B1 | * | 4/2002 | Ito et al. ..................... 348/554 |
| 6,414,991 B1 | * | 7/2002 | Yagasaki et al. ........ 375/240.12 |

* cited by examiner

Primary Examiner—Chris Kelley
Assistant Examiner—Charles Parsons

(57) ABSTRACT

The invention, provided for an implementation, in a video encoder with base layer coding means and enhancement layer coding means, relates to a method of coding the video objects (VOs) of a sequence according to the following steps: segmentation of the sequence, and coding operation of the texture and shape of said VOs. According to a preferred embodiment, the texture coding operation itself comprises motion compensated prediction operations, during which the temporal references of the enhancement layer VO planes (VOPs) of type P or B are selected only on a temporal distance criterion, without any consideration of the layer they belong to.

4 Claims, 1 Drawing Sheet

VIDEO CODING METHOD AND CORRESPONDING ENCODER

BACKGROUND OF THE INVENTION

1. Field of the Invention

The present invention generally relates to video compression, and more particularly, to a video coding method applied to a video sequence and provided for use in a video encoder comprising base layer coding means, receiving said video sequence and generating therefrom base layer signals that correspond to video objects (Vos) contained in the video frames of said sequence and constitute a first bitstream suitable for transmission at a base layer bit rate to a video decoder, and enhancement layer coding means, receiving said video sequence and a decoded version of said base layer signals and generating therefrom enhancement layer signals associated with corresponding base layer video signals and suitable for transmission at an enhancement layer bit rate to said video decoder.

2. Description of the Related Art

More precisely, the present invention relates to a method allowing to code the VOs of said sequence and comprising the steps of:

(A) segmenting the video sequence into said VOs;

(B) coding the successive video object planes (VOPs) of each of said VOs, said coding step itself comprising sub-steps of coding the texture and the shape of said VOPs, said texture coding sub-step itself comprising a first coding operation without prediction for the VOPs called intracoded or I-VOPs, coded without any temporal reference to another VOP, a second coding operation with a unidirectional prediction for the VOPs called predictive or P-VOPs, coded using only a past I- or P-VOP as a temporal reference, and a third coding operation with a bidirectional prediction for the VOPs called bidirectional predictive or P-VOPs, coded using both past and future I- or P-VOPs as temporal references.

The invention also relates to computer executable process steps stored on a computer readable medium and provided for carrying out such a coding method, to a corresponding computer program product, and to a video encoder carrying out said method.

The temporal scalability is a feature now offered by several video coding schemes. It is, for example, one of the numerous options of the MPEG-4 video standard. A base layer is encoded at a given frame rate, and an additional layer, called enhancement layer, is also encoded, in order to provide the missing frames to form a video signal with a higher frame rate and thus to provide a higher temporal resolution at the display side. At the decoding side, only the base layer is usually decoded, but the decoder may also, in addition, decode the enhancement layer, which allows to output more frames per second.

Several structures are used in MPEG-4, for example the video objects (VOs), which are the entities that a user is allowed to access and manipulate, and the video object planes (VOPs), which are instances of a video object at a given time. In an encoded bitstream, different types of VOPs can be found: intra coded VOPs, using only spatial redundancy, predictive coded VOPs, using motion estimation and compensation from a past reference VOP, and bidirectionally predictive coded VOPs, using motion estimation and compensation from past and future reference VOPs. As the MPEG-4 video standard is a predictive coding scheme, some temporal references have to be defined for each coded non-intra VOP. In the single layer case or in the base layer of a scalable stream, temporal references are defined by the standard in a unique way, as illustrated in FIG. 1 where, the base and enhancement layers being designated by (BL) and (EL) respectively, the reference for a P-VOP and a B-VOP are shown (each arrow corresponds to a possible temporal reference). On the contrary, for the temporal enhancement layer of an MPEG-4 stream, three VOPs can be taken as a possible temporal reference for the motion prediction: the most recently decoded VOP of the enhancement layer, or the previous VOP in display order of the base layer, or the next VOP in display order of the base layer, as also illustrated in FIG. 1 where these three possible choices are shown for a P-VOP and a B-VOP of the temporal enhancement layer: one reference has to be selected for each P-VOP of the enhancement layer and two for each B-VOP of the same layer.

SUMMARY OF THE INVENTION

It is therefore the object of the invention to propose a video coding method allowing to obtain an improved prediction accuracy.

To this end the invention relates to a coding method such as defined in the introductory paragraph of the description and in which the temporal reference of the enhancement layer P-VOPs is selected only as the temporally closest candidate, and the temporal references of the enhancement layer B-VOPs are selected as the two temporally closest candidates, in each of these two situations without any consideration of the layer these candidates belong to.

BRIEF DESCRIPTION OF THE DRAWING

The present invention will now be described, by way of example, with reference to the accompanying drawing in which.

DETAILED DESCRIPTION OF THE PREFERRED EMBODIMENTS

Figure 1:
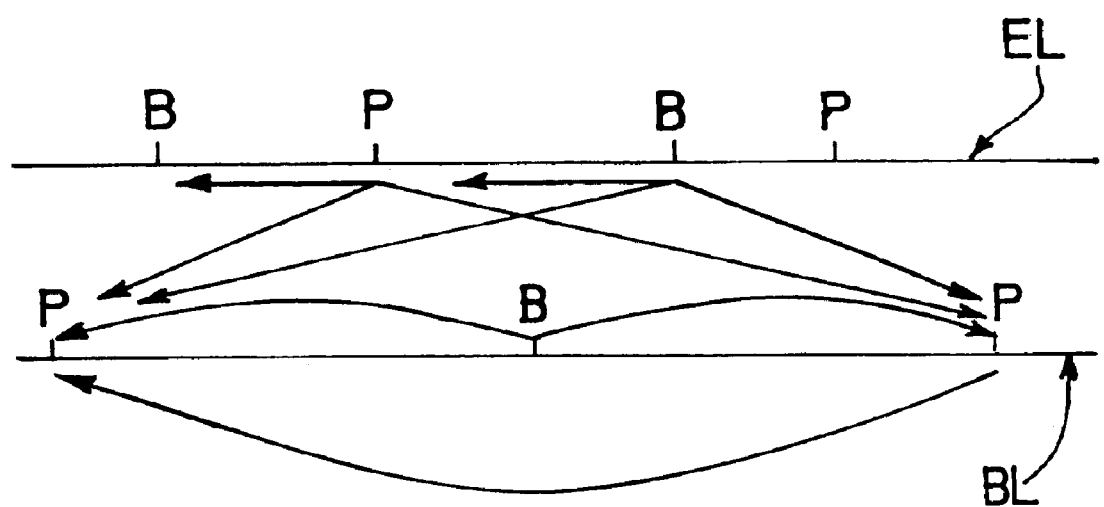
FIG. 1 illustrates the possible temporal references in the case of a scalable MPEG-4 video stream.

In a predictive coding scheme such as MPEG-4, three types of coding operations can be performed: either a first one without prediction for the VOPs called intracoded or I-VOPs, coded without any temporal reference to another VOP, or a second one with a unidirectional prediction for the VOPs called predictive or P-VOPs, coded using only a past or a future I- or P-VOP as a temporal reference, or a third one with a bidirectional prediction for the VOPs called bidirectional predictive or B-VOPs, coded using both past and future I- or P-VOPs as temporal references. As seen above, during the encoding process, one reference has to be selected (out of three candidates) for each P-VOP of the enhancement layer and two for each B-VOP of said layer. It is then decided, according to the invention, to select these temporal references of the enhancement VOPs only on the basis of a temporal distance criterion, without any consideration of the layer they belong to. Consequently, the selection of these temporal references is performed according to the following rules:

(a) for a P-VOP, the reference is the temporally closest candidate;

(b) for a B-VOP, the references are the two temporally closest candidates.

The invention also relates to a video encoder allowing to perform the coding method including the selection step hereinabove described. Such a video encoder receives the original video signal that is transferred to a base layer encoding unit for generation of a base layer bitstream and to an enhancement layer encoding unit for generation of an enhancement layer bitstream. The base layer encoding unit contains a main processing branch, comprising a motion prediction circuit (said prediction is based on the selected temporal references), a discrete cosine transform (DCT) circuit, a quantization circuit, an entropy coding circuit, and a base layer bit buffer that generates the coded base layer bitstream, and a feedback branch comprising an inverse quantization circuit, an inverse discrete cosine transform (IDCT) circuit, and a frame memory. Similarly, the enhancement layer encoding unit generates the enhancement layer bitstreams.

It must be understood such a video encoder can be implemented in hardware or software, or by means of a combination of hardware and software. It may then be implemented by any type of computer system or other apparatus adapted for carrying out the method described herein. A typical combination of hardware and software could be a general-purpose computer system with a computer program that, when loaded and executed, controls the computer system such that it carries out the method described herein. Alternatively, a specific use computer, containing specialized hardware for carrying out one or more of the functional tasks of the invention, could be utilized. The present invention can also be embedded in a computer program medium or product, which comprises all the features enabling the implementation of the method described herein, and which—when loaded in a computer system—is able to carry out this method. The invention also relates to the computer executable process steps stored on such a computer readable medium or product and provided for carrying out the described video coding method. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation, and/or (b) reproduction in a different material form.

What is claimed is:

1. A method for coding used by a video encoder that includes a base layer coding means, provided for receiving a video sequence and generating therefrom base layer signals that correspond to one or more video objects (VOs) contained in the video frames of said sequence and constitute a first bitstream suitable for transmission at a base layer bit rate to a video decoder, and enhancement layer coding means, provided for receiving said video sequence and a decoded version of said base layer signals and generating therefrom enhancement layer signals associated with corresponding base layer signals and suitable for transmission at an enhancement layer bit rate to said video decoder, wherein said method comprises coding the VOs of said sequence according to the steps of: (A) segmenting a video sequence into one or more VOs; (B) coding a plurality of successive video object planes (VOPs) of each of said VOs, said coding step itself comprising sub-steps of (i) coding the texture of said VOPs, and (ii) coding the shape of said VOPs, wherein sub-step (B)(i) comprises:

(a) performing a first coding operation without prediction for the VOPs defined as intracoded or I-VOPs, coded without any temporal reference to another VOP, (b) performing a second coding operation with a unidirectional prediction for the VOPs defined as predictive or P-VOPs, coded using only a past I- or P-VOP as a temporal reference, and (c) performing a third coding operation with a bidirectional prediction for the VOPs defined as bidirectional predictive or B-VOPs, coded using both past and future I- or P-VOPs as temporal references, wherein the temporal reference of the enhancement layer P-VOPs is selected only as the temporally closest candidate, and the temporal references of the enhancement layer B-VOPs are selected as the two temporally closest candidates, in either case without any consideration of the layer to which the temporally closest candidates belong.

2. Computer executable process steps stored on a computer readable medium and provided for carrying out a coding method according to claim 1.

3. A computer program product for a video encoder, for carrying out in said encoder the coding method according to claim 1, which product comprises a set of instructions which, when loaded into said encoder, causes it to carry out the steps of said method.

4. A video encoder comprising:

base layer coding means for receiving a video sequence and generating therefrom base layer signals that correspond to video objects (VOs) contained in the video frames of said sequence comprising a first bitstream suitable for transmission at a base layer bit rate to a video decoder, and enhancement layer coding means for receiving said video sequence and a decoded version of said base layer signals and generating therefrom enhancement layer signals associated with corresponding base layer signals and suitable for transmission at an enhancement layer bit rate to said video decoder, said video encoder further comprising:

(A) means for segmenting the video sequence into said VOs;

(B) means for coding the texture and the shape of successive video object planes (VOPs) of each of said VOs, the texture coding means performing a first coding operation coding without prediction for the VOPs called intracoded or I-VOPs, coded without any temporal reference to another VOP, a second coding operation with a unidirectional prediction for the VOPs called predictive or P-VOPs, coded using only a past I- or P-VOP as a temporal reference, and a third coding operation with a bidirectional prediction for the VOPs called bidirectional predictive or B-VOPs, coded using both past and future I- or P-VOPs as temporal references wherein the temporal reference of the enhancement layer P-VOPs is selected only as the temporally closest candidate, and the temporal references of the enhancement layer B-VOPs are selected as the two temporally closest candidates, in either case without any consideration of the layer to which the temporally closest candidates belong.

* * * * *